United States Patent [19]
Karlicek

[11] Patent Number: 5,765,592
[45] Date of Patent: Jun. 16, 1998

[54] VALVE

[75] Inventor: Thomas Alan Karlicek, San Ramon, Calif.

[73] Assignee: The BOC Group, Inc., New Providence, N.J.

[21] Appl. No.: 601,624

[22] Filed: Feb. 14, 1996

[51] Int. Cl.$^6$ .................................................. F16K 11/02
[52] U.S. Cl. ........................................ 137/601; 454/319
[58] Field of Search ............................. 137/601; 454/31, 454/319

[56] References Cited

U.S. PATENT DOCUMENTS

| | | | |
|---|---|---|---|
| 1,937,669 | 12/1933 | Replogle | 454/319 X |
| 2,178,894 | 11/1939 | Morgan | 454/319 |
| 2,557,213 | 6/1951 | Artis | 454/31 X |
| 3,802,328 | 4/1974 | Kakizaki | 137/601 X |

*Primary Examiner*—Stephen M. Hepperle
*Attorney, Agent, or Firm*—David M. Rosenblum; Salvatore P. Pace

[57] ABSTRACT

A valve body having a circular throat and three vanes mounted for rotation within the circular throat of the valve body. The three vanes comprise two outlying vanes, each having two opposed circular peripheral edges configured so that one of the two opposed circular peripheral edges fits against a circular throat when the vanes are in the closed position. A central vane, preferably of hour glass configuration, is located between the two outlying vanes so that all three vanes nest within the circular throat and against one another when the valve is a closed position. Each of the vanes has a symmetrical axis of rotation and is mounted within the circular throat of the valve body so as to rotate about the symmetrical axis.

8 Claims, 2 Drawing Sheets

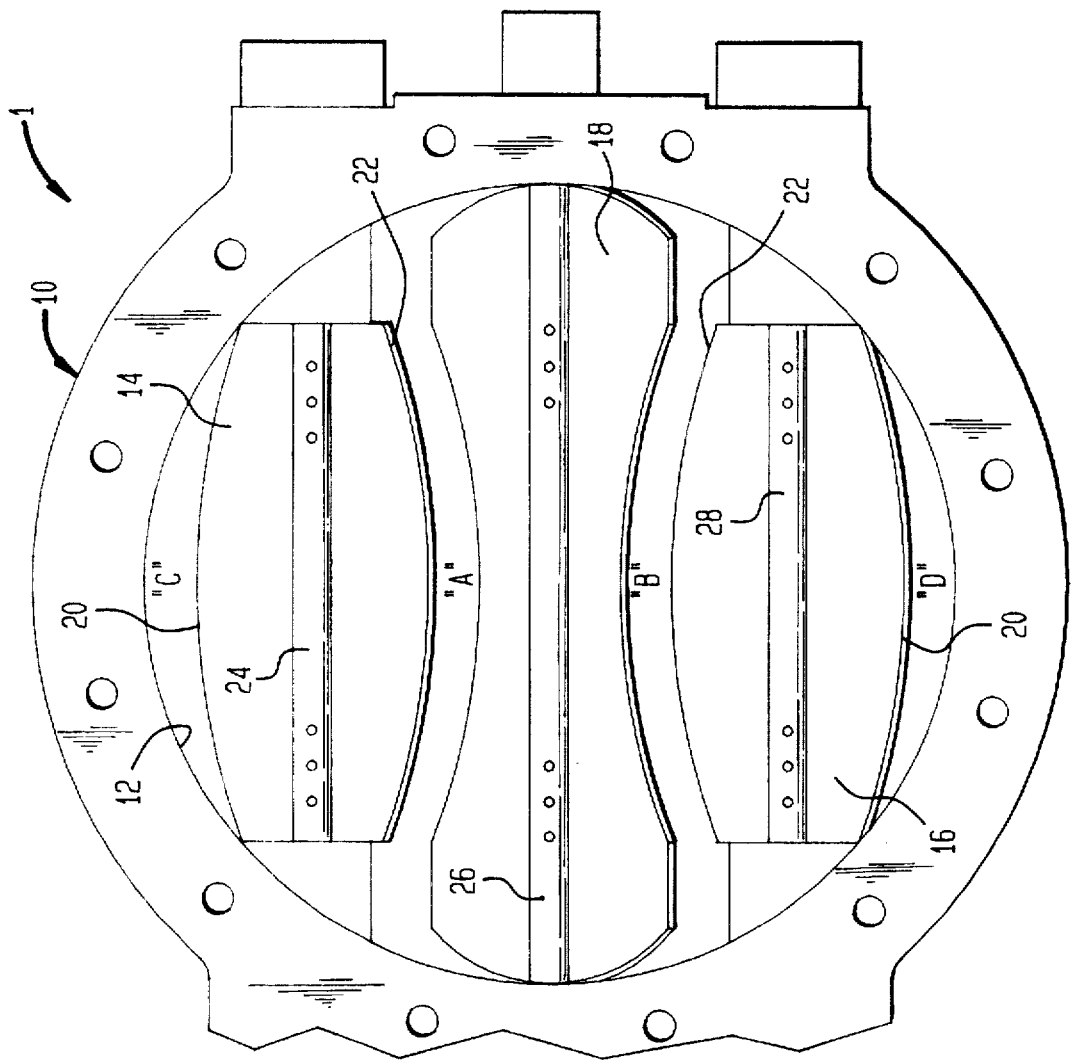

5,765,592

1
VALVE

BACKGROUND OF THE INVENTION

The present invention relates to a valve having tree vanes mounted within a circular throat of a valve body for rotation between open and closed positions to throttle flow within the throat of the valve body. More particularly, the present invention relates to such a valve in which each of the vanes is configured to rotate about an axis of symmetry so that rotational movement of the vanes is balanced.

In the prior art, butterfly valves employ a circular disk or butterfly that is rotatable between open and closed positions to throttle flow. The problem with such valves is that they tend to accumulate contaminants within the Hat of the valve because the disk, when in the open position, directs the flow against one side of the valve. The accumulation of contaminants is particularly troublesome for valve applications involving clean environments, such as in semiconductor fabrication. Shutter-like valve systems have also been produced that utilize a shutter-like arrangement of vanes to throttle flow. The advantage inherent in this type of valve system is that, when the valve is set in the open position, the open area of the valve throat is greater at central locations than at wall locations. This tends inhibit flow from being directed against one side of the valve throat. The problem with multiple vanes, at least when the vanes are used in connection with a circular valve threat, is that the outlying vanes, against the throat of the valve, are not designed with a symmetric axis of rotation. As a result, the rotation of such elements is not balanced and the speed of response of the valve suffers.

As will be discussed, the present invention provides a valve having multiple vanes in which the vanes are designed to be symmetric about their axis of rotation in order to increase the response speed of the valve.

SUMMARY OF THE INVENTION

The present invention provides a valve body having a circular throat and three vanes mounted for rotation within the circular throat of the valve body between an open position and a closed position. The three vanes comprise two outlying vanes, each having two opposed circular peripheral edges configured so that one of the two opposed circular peripheral edges fits against the circular throat when the vanes are in their closed position. A central vane is located between the outlying vanes. Each of the three vanes is configured to have a symmetrical axis of rotation and is mounted within the circular throat of the valve body so as to rotate about the symmetrical axis. As a result each of the vanes is balanced in its rotation to increase the response speed of the valve.

BRIEF DESCRIPTION OF THE DRAWINGS

While the specification concludes with claims distinctly pointing out the subject mater that Applicant regards as his invention, it is believed tat the invention will be better understood when taken in connection with the accompanying drawings in which:

FIG. 3 is a fragmentary, top plan view of a valve in accordance with the present invention in which the vanes are shown rotated about a 60° to an open position.

Figures 1, 2:
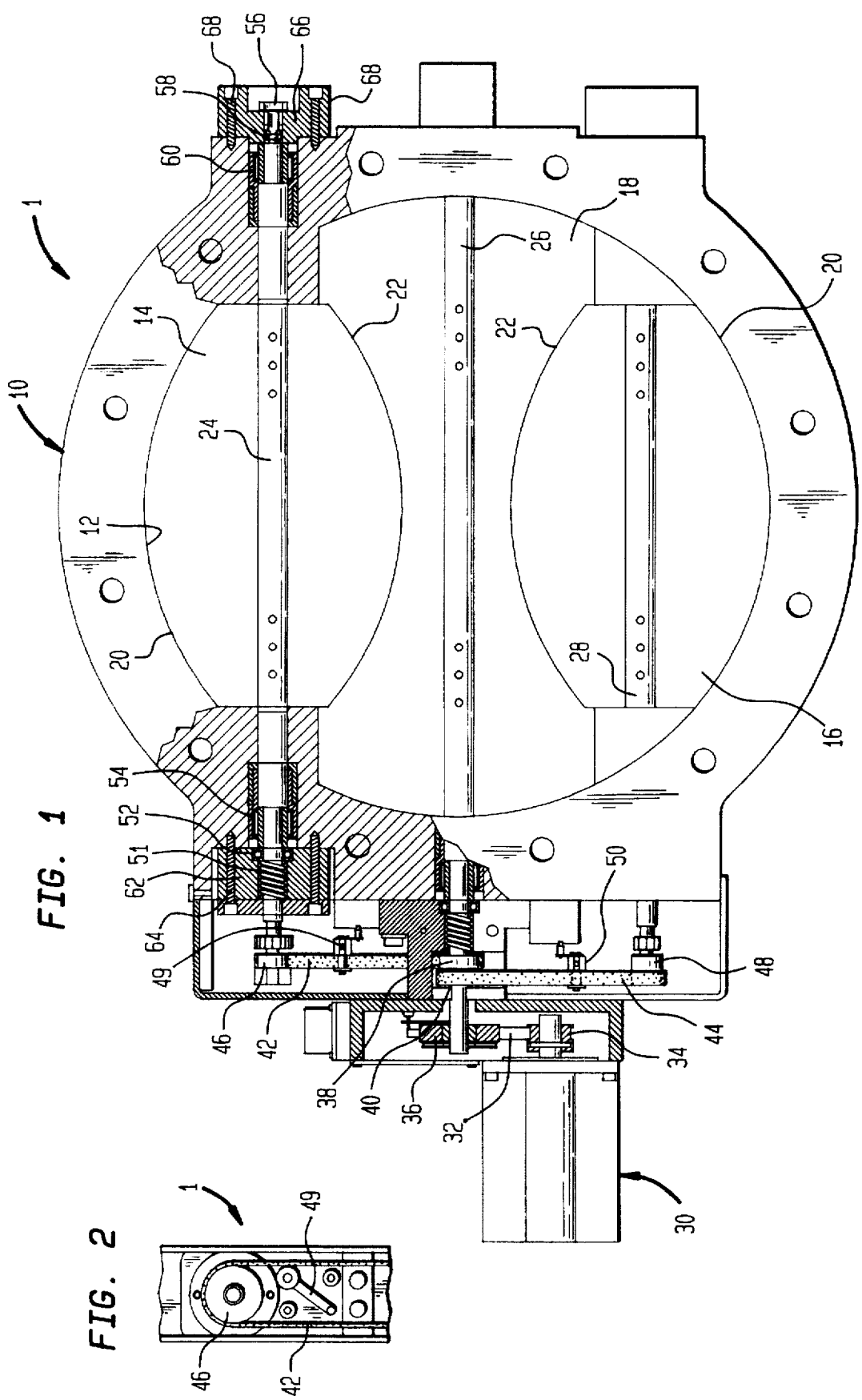
FIG. 1 is a top plan view of a valve in accordance with the present invention with portions broken away and with the valve shown in a closed position.
FIG. 2 is a fragmentary end view of FIG. 1 illustrating a belt tensioning mechanism of the present invention.

2
DETAILED DESCRIPTION

With reference to FIGS. 1 and 2, a valve 1 in accordance with the present invention is illustrate& Valve 1 has a valve body 10, a circular throat 12, two outlying vanes 14 and 16 and a central vane 18. The foregoing three vanes (14, 16, and 18) are mounted for rotation within circular throat 12 of valve body 10.

It is to be noted that although valve body 10 is illustrated as having a flange-like configuration, the present invention is not meant to be limited to this specific embodiment. In this regard, the present invention as recited in the claims is intended to cover apparatus in which the valve body forms part of a larger apparatus and is therefore integrally formed with such a further point is that although valve 1 has particular application to a clean environment designed to operate under vacuum conditions, the present invention is not so limited in its application. Additionally, the present invention has equal application to proportional valve movements and valves having only two open and closed positions.

Each of outlying vanes 14 and 16 have two opposed circular peripheral edges 20 and 22 that are configured so that edge 20 fits against circular throat 12 when the vanes are in the closed position. Peripherial edges 20 and 22 are spaced apart from one another as opposed to touching one another (another possible embodiment) at the ends of each of outlying vanes 14 and 16. The central vane has an hour glass-like periphery and is configured so Fat circular peripheral edges 22 of vanes 14 and 16 nest within the hour glass-like periphery of central vane 18 when vanes 14, 16 and 18 are in the closed position.

It is to be noted that central vane 18 could have a rectangular-like configuration and as such, have two straight, lengthwise extending edges overlapping outlying vanes 14 and 16 in the closed position. As could be appreciated by those skilled in the art, the overlap would not be desirable in contaminant-free environments because contaminants would tend to collect within the overlap.

With additional reference to FIG. 3, vanes 14, 16, and 18 are proportioned and as will be discussed, rotate at the same angular rotation, such tat the two central open areas "A" and "B" (located between outlying vanes 14 and 16 and central vane 18) are greater than the two outlying areas "C" and "D" (located between the wall of valve body 10 and outlying vanes 14 and 16) for a given angular rotation of the vanes. As a result, the flow through valve 1 is greater in central regions of the valve than outlying areas to balance the flow through valve 1, thereby to help prevent the entire flow from being directed against the wall of valve body 10. As mentioned above, flow against the walls of valve body 10 (or for that matter apparatus in which valve body 10 is mounted) produce an undesirable retention of contaminants within the valve.

As illustrated, vanes 14, 16 and 18 are mounted on shafts 24, 26 and 28, respectively. Each of the vanes has a symmetrical axis of rotation, or in other words, is configured to to divided by a longitudinal plane along such symmetrical axis into two similar halves. Since vanes 14, 16, and 18 are mounted so that shafts 24, 26, and 28 coincide with such axis, rotation of shafts 24, 26, and 28 will produce a balanced rotation of vanes 14, 16, and 18. This balanced rotation allows vanes 14, 16, and 18 to be rotated at a higher angular speed of rotation than vanes not having such a symmetrical axis of rotation.

Shafts 24, 26, and 28 are rotated by a stepper motor 30 acting on shaft 26 by way of drive belt 32 engaging a drive pulley 34 connected to motor 30 and a driven pulley 36 attached to shaft 26. The rotation of shaft 26 is transmitted to driven belts 42 and 44 through inner pulleys 38 and 40 attached to shaft 26. Driven belts 42 and 44 in turn engage outer driven pulleys 46 and 48 which are attached to shafts 24 and 28, respectively. Belt tension is maintained by belt tensioning mechanisms 49 and 50. Thus, shafts 24, 26 and 28 and vanes 14, 16, and 18, rotate in the same direction under impetus of motor 30. As could be appreciated, it would be completely consistent with the present invention to separately drive each of vanes 14, 16, and 18 so that for a given open position for valve 1, vanes 14 and 16 would have a greater or lesser angular rotation than central vane 18.

Each of the shafts is preferably mounted for rotation within valve body 10 by a known mechanism that is illustrate for shaft 24. This mechanism includes a spring 51 which bears against an annular thrust bearing 52. Thrust bearing 52 in turn bears against a needle bearing 54 to urge shaft 24 away from the spring or the right in the illustration. Shaft 24 is, however, held in position by a set screw 56 which bears against an annular thrust bearing 58 which in turn bears against the end of shaft 24. A needle bearing 60 rotatably attaches shaft 24 to valve body 10 at the end of shaft 24 opposite to engagement of spring 50. Spring 50 is compressed by a bearing housing 62 that is connected to valve body 10 by studs 64. Set screw 56 is threaded within an opposed bearing housing 66 that is attached to valve body 10 by studs 68.

The advantage of the foregoing mechanism is that rotation of set screw 56 in opposition to spring 50 will properly align shaft 24 and thus vane 14 within throat 12 of valve body 10. It should be stated that the specific illustration of the foregoing mechanism is not intended to limit the scope or application of the present invention.

While the invention has been described with reference to a preferred embodiment, as will occur to those skilled in the art, numerous changes, omissions can be made without departing from the spirit and scope of the present invention.

I claim:

1. A valve comprising:

a valve body having a circular throat; and three vanes mounted for rotation within said circular throat of said valve body between an open position and a closed position, closing off said circular throat;

said three vanes comprising two outlying vanes, each having two opposed circular peripheral edges configured so that one of said two opposed circular peripheral edges fits against said circular tat when said vanes are in their said closed position, and a central vane located between said outlying vanes;

each of said tree vanes configured to have a symmetrical axis of rotation and being mounted within said circular tat of said valve body so as to rotate about the said symmetrical axis of rotation.

2. The valve of claim 1, wherein said opposed circular peripheral edges are spaced apart from one another.

3. The valve of claim 1, wherein said central vane has an hour glass-like peripheral edge.

4. The valve of claim 3, wherein:

said three vanes are mounted so that each of said three vanes rotate in the same direction and at the same angular rate; and said three vanes are proportioned so that two central open areas, defined between said central vane increases at a greater rate than two outlying areas, defined between said outlying vanes and said valve body, as said three vanes are rotated from their said closed to open position.

5. The valve of claim 3 wherein said hour glass-like peripheral edge of said central vane is configured such that the other of said circular edges of said two outlying vanes nest within said hour glass-like periphery of said central vane when said three vanes are in their said closed position.

6. The valve of claim 5, wherein said opposed circular peripheral edges are spaced apart from one another.

7. The valve of claim 5, wherein said tree vanes are mounted so that each of said three vanes rotates at the same angular rate.

8. The valve of claim 7, wherein opposed circular peripheral edges are spaced apart from one another.

* * * * *